T. J. SLOAN.
MACHINES FOR MAKING SLOPED-NICKED WOOD-SCREWS.

No. 173,355.

5 Sheets—Sheet 1.

Patented Feb. 8, 1876.

Witnesses:
Ernst Bilhuber.
Elbert Dearborn.

Inventor:
Thomas J. Sloan
per James A. Whitney
Attorney.

5 Sheets—Sheet 3.

T. J. SLOAN.
MACHINES FOR MAKING SLOPED-NICKED WOOD-SCREWS.

No. 173,355. Patented Feb. 8, 1876.

Witnesses:
Ernst Bilhuber
Elbert Dearborn

Inventor:
Thomas J. Sloan
pa James A. Whitney
Attorney.

T. J. SLOAN.
MACHINES FOR MAKING SLOPED-NICKED WOOD-SCREWS.
No. 173,355. Patented Feb. 8, 1876.

UNITED STATES PATENT OFFICE.

THOMAS J. SLOAN, OF NEW YORK, N. Y.

IMPROVEMENT IN MACHINES FOR MAKING SLOPED-NICKED WOOD-SCREWS.

Specification forming part of Letters Patent No. 173,355, dated February 8, 1876; application filed January 17, 1876.

*To all whom it may concern:*

Be it known that I, THOMAS J. SLOAN, of the city, county, and State of New York, have invented certain Improvements in Machines for Making Wood-Screws, of which the following is a specification:

This invention is designed for making the screws represented in Figs. 7, 8, and 9 of the accompanying drawings, which, for convenience, I designate as "slope-nicked screws."

The invention embraces, in an organized machine for the manufacture of the slope-nicked screws aforesaid, a blank-holding spindle, having an intermittent revolving movement around its own axis, in combination with a nicking-saw, arranged to automatically move to and from the blank-holding end of said spindle alternately with each semi-revolving movement of said spindle, whereby provision is made for forming the oppositely-sloping surfaces of the nicks of the aforesaid variety of screws.

The invention also embraces an organized machine comprising the double-revolving spindles, arranged to hold screw-blanks during the operation of nicking, and having an intermittent movement around an axis common to both, a mechanism for giving each of the said spindles alternately a half-revolution around its own axis, and a nicking-saw, provided to move to and from each spindle in the intervals between its aforesaid revolutions, the whole being so combined and arranged with reference to a mechanism for feeding the screw-blanks to the spindles that the said blanks passing from the feeding mechanism to the spindles are, when desired, first shaved, and are then nicked with the peculiar sloping nick desired, the blanks following each other in rapid succession, so that the cost of manufacturing this variety of screws is brought down to a rate not appreciably greater than that of making common wood-screws.

Figure 1:
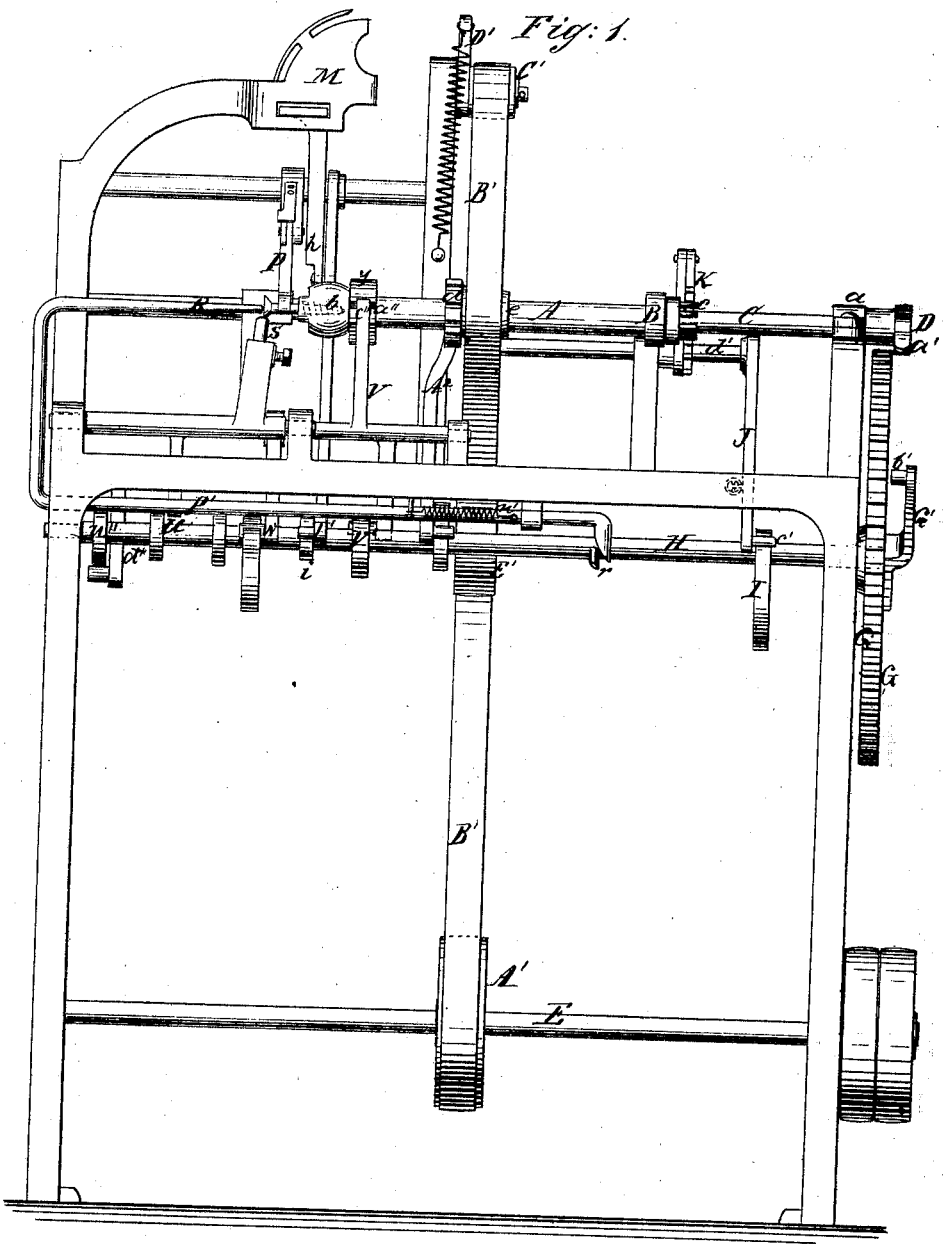
Figure 2:
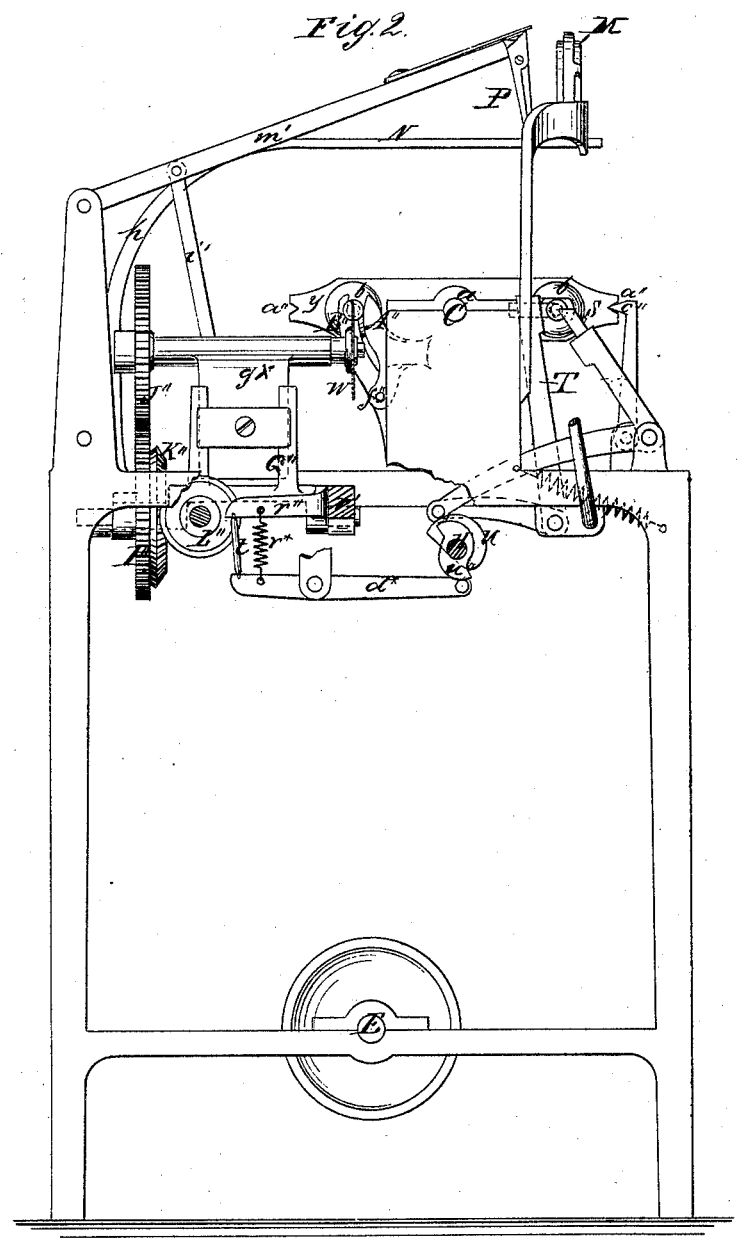
Figure 3:
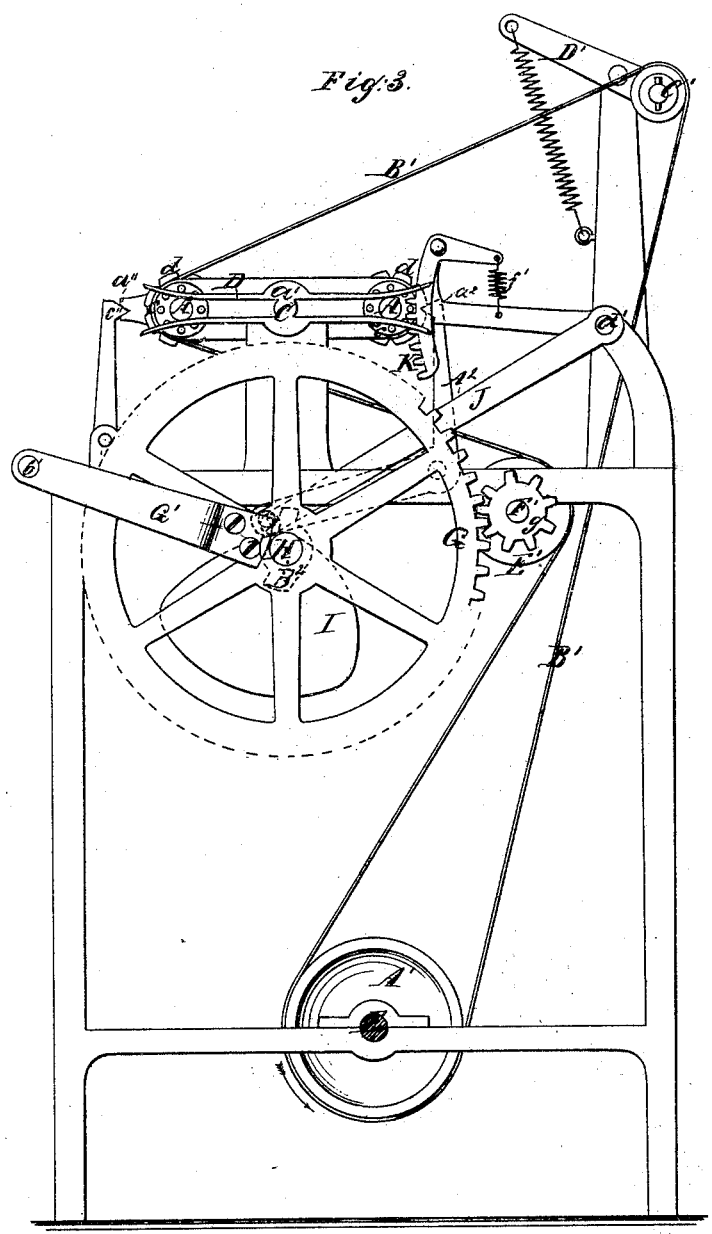
Figure 4:
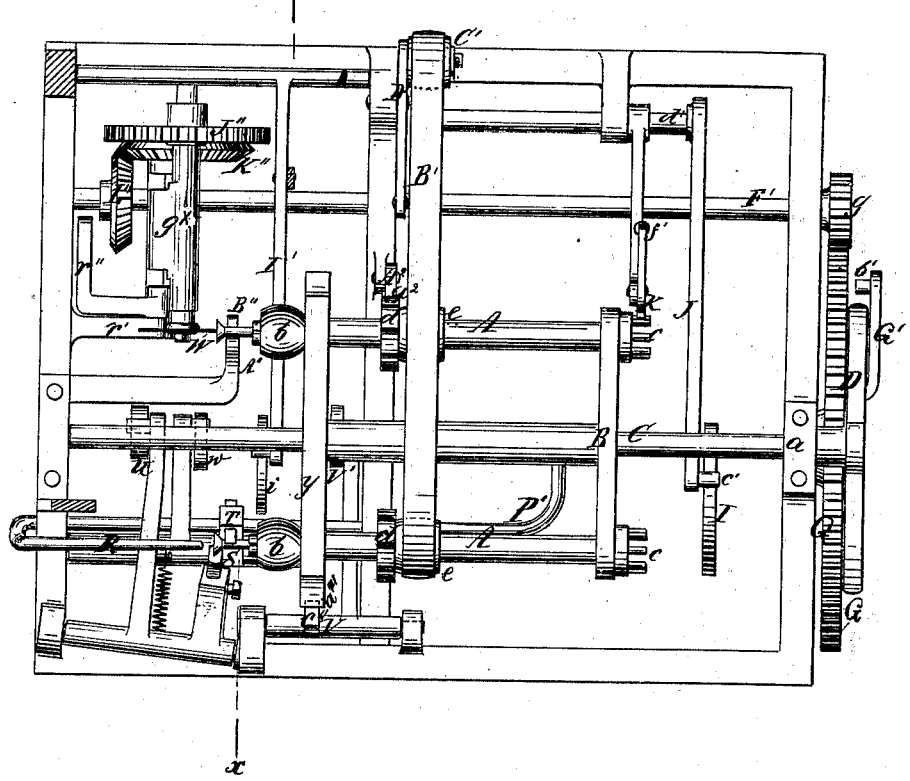
Figure 5:
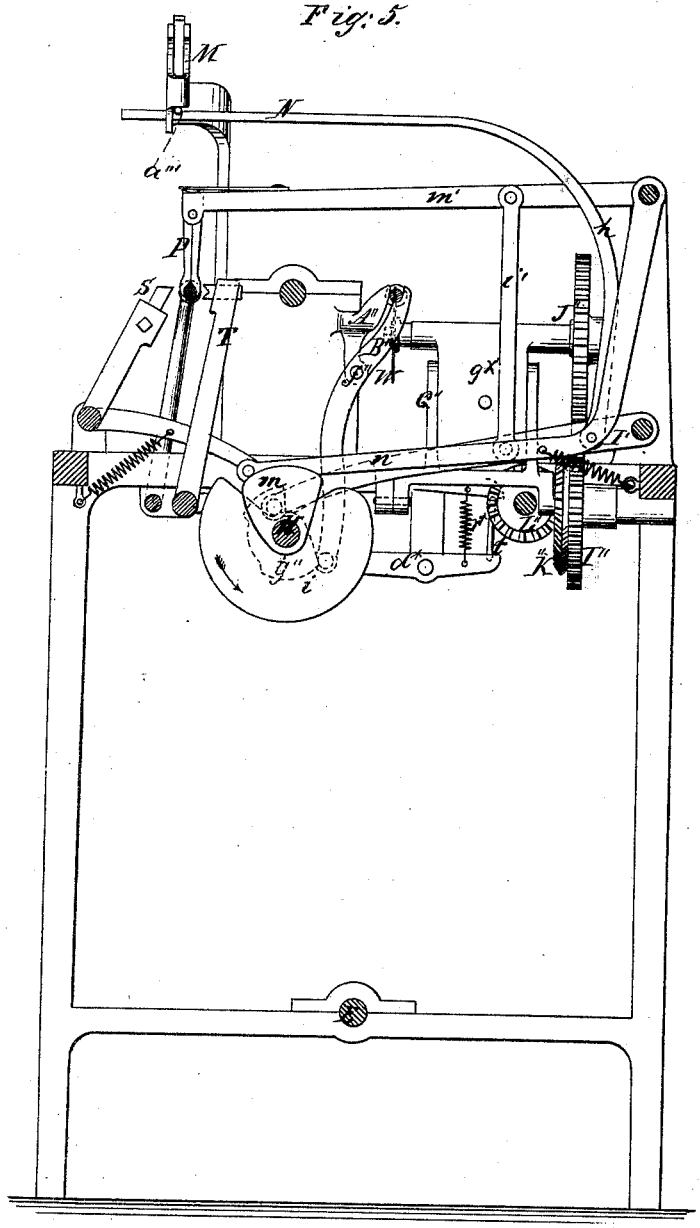

Figure 1 is a front elevation of a machine made according to my invention. Fig. 2 is an end view. Fig. 3 is an opposite end view. Fig. 4 is a plan view, and Fig. 5 is a vertical section of the same, taken in the line $x$ of Fig. 4. Fig. 6 is a detail view of one portion of the same. Figs. 7, 8, and 9 are views showing the form and construction of the slope-nicked screw, for the manufacture of which the machine is designed.

A are two spindles, parallel with each other in a frame, B, carried by a shaft, C, placed equidistant between them, and supported in suitable bearings $a$. Each spindle A has at one end, $b$, a pair of clamping-jaws, for holding screw-blanks during the operation of nicking and shaving, these clamping-jaws being identical in construction and operation with those used in the machinery for nicking and shaving wood-screws in common use, and, therefore, requiring no specific description here. At the opposite end of each spindle is a small gear, $c$, and midway on each of said spindles is a peripherically-notched disk, $d$, and a band-wheel, $e$. Upon that end of the shaft C adjacent to the gears $c$ is a transverse bar, D, the opposite extremities of which are forked, as shown at $a'$. E is the driving-shaft, rotated by any suitable means, and furnished with a driving-pulley, A'. From this extends the driving-band B', which passes over an idler-pulley, C', carried on a spring-arm, D', thence around the spindles A in contact with the band-wheel $e$, farthest from the idler-pulley aforesaid, and then, with an inward bend, in contact with a pulley, E', on a shaft, F', all as shown more fully in Fig. 3. Upon the end of the shaft F' is a pinion, $g$, which gears into a spur-wheel, G, which has a radial arm, G', provided with an inwardly-projecting pin, $b'$, which, in the rotation of the shaft F', turns the spur-wheel G, so that its pin $b'$ enters the adjacent forked end $a'$ of the bar D. The continued rotatory movement of the pin will carry the bar D, and, consequently, the shaft C with its attached spindles A, one-half of a revolution around, bringing the bar to its original position, but with its ends reversed, so that when the pin $b'$ comes around again it will cause another half revolution of the shaft C and its adjuncts.

The shaft H of the spur-wheel G has a cam, I, which acts upon a lateral stud, $c'$, of a lever, J, to give movement to a rock-shaft, $d'$, which carries a toothed sector, K, arranged in such position that at each semi-revolution of the shaft C—in other words, of the spindles about an axis common to both—the gear $c$ of that spindle nearest the sector K will come into gear therewith, so that the action of the cam I lifting the lever J, and consequently the sector K, will turn the aforesaid spindle one-half of a revolution about its own axis. In order that the coming into gear of the gears $e$ and sector K may not risk the breakage of the teeth of either, the sector K is pivoted at its upper end to the upper extremities of the lever J, and held forward in position proper for the meshing of the gears by a spring, $f'$, the sector being thus enabled to yield to the contact of the gears when, for any reason, the same jar or strike with too much force against the sector. It will be observed that the belt passing over the band-wheel $e$ of the outermost spindle A, must rotate the said spindle continuously about its own axis, this motion of the outermost spindle, however, having reference to the shaving of screw-blanks, which it is designed shall proceed in conjunction with the operations especially relating to or included in my invention. M is a fixed hopper so arranged as to be above the jaws $b$ of the outermost of the spindles A. N is a carrier for receiving the screw-blanks, one by one, in succession from the hopper M, this carrier being formed with a channel or cavity, $a'''$, in its upper side to receive the screws, and having its supporting-arm $h$ attached to a lever, $l'$, worked by a cam, $i$, on the shaft H. P are picker-fingers, which pick up the blanks one at a time from the carrier, and convey them downward, and hold them in line with the opening of the jaws $b$ of the aforesaid outermost spindle, the requisite motion being given to the picker-fingers from a cam, $m$, on the shaft H, acting upon a lever, $n$, connected by a rod, $i'$, with the pivoted arm $m'$, by which the picker-fingers are carried. When the screw blanks, as just hereinbefore set forth, are brought in line with the opening of the jaws P, they are forced longitudinally inward to the same to the requisite degree by a rod or pusher, R, provided on a sliding bar, P', pressed outward by a spring, $n'$, and moved inward in the just described operation of the pusher by a cam, $r$, on the shaft, H. As the hopper-carrier, picker-fingers, and pusher, just described, although constituting together one of the elements of one of my novel combinations, are identical with those used in common shaving and nicking machines, both in their construction and *modus operandi* in feeding the blanks to the jaws, they require no further detailed description in this connection. S is the ordinary shaving-tool brought adjacent and in suitable relation to the head of the blank held in the jaws of the outmost spindle A by means of a cam, $u$, on the shaft H. T is the ordinary back-rest, operated in like manner by a cam, $w$, on the said shaft H. Each of the blanks being conveyed, as hereinbefore set forth, from the hopper to the jaws of the outermost spindle A, is there shaved in the usual manner. As soon as the blank is thus shaved the pin $b'$ of the arm G', entering one of the forked ends of the bar D, turns the shaft C one-half of a revolution, thereby bringing the spindle A holding the shaved blank to the inner side of the apparatus, and bringing the other of the said spindles outermost, where it receives the succeeding blank from the hopper, to be shaved in like manner.

In order that the two spindles may be held in exact position after each semi-revolution about their common axis, as explained, a cross-bar, $y$, is provided to them, in each end of which is an angular notch, $a''$. An elbow-lever, V, actuated by a cam, V', on the shaft H, has at its upper extremity a stud, $c''$, which at the end of each semi-revolution of the two spindles, as aforesaid, enters the adjacent notch $a''$, and holds the spindles firm until the continued rotation of the cam V' releases the same preparatory to another semi-rotation of the said two spindles. As the two spindles are thus rotated by and around the shaft C, the spindle holding the shaved blank brings the projecting portion of the said blank in contact with a fixed shoulder, A'', simultaneously with which a movable clamp, B'', pivoted to the shoulder A'' at $f''$, and actuated by a cam, $g''$, on the shaft H, is brought against the opposite side of the aforesaid projecting portion of the shaved blank, the said portion being thereby steadied and held firm during the succeeding operation of nicking. The spindle is also steadied against even slight rotation by a stud, $a^2$, on the end of a lever, A$^2$, actuated by a cam, B$^2$, on the shaft H, the said stud entering one of the notches of the disk on the spindle, having the shaved blank to keep the same from turning until released by a further movement of the cam. W is the nicking-saw, the arbor $g^\times$ of which is carried in bearings in the upper part of a rocking standard, G'', and which has upon that end opposite the nicking-saw a spur-wheel, J'', which receives motion from another spur-wheel, I'', and a lantern or level wheel, K'', which latter gears into a pinion, L'', on the shaft F'. The rocking standard G'' is pivoted at $r'$, and has a horizontally-extending arm, $r''$, connected by a rod, $t$, with a lever, $a^*$, actuated by a cam, $u''$, on the shaft H, the free end of said lever being pressed in contact with the face of said cam by a spring, $r^*$. The rotary motion of the nicking-saw being, as hereinbefore explained, derived from the shaft, is of course continuous.

When the semi-revolution of the shaft C, and consequently of the two spindles A, has brought that one of the latter holding the nicked screw between the clamp B'' and the shoulder A'', as hereinbefore explained, the action of the cam $u''$ rocks inward the rocking standard G'', and thereby brings the nicking-saw W against the lowermost half of the head of the blank, thereby cutting a sloping half-nick in said lowermost side of said head; this sloping half-nick extending from the axial center of the head to the outer edge or side thereof shallowest or merging to the flat surface of the head at the axial line thereof, but deep at the edge or circumference.

In order to complete the nicking operation it is necessary to form a second half-nick of the same character exactly opposite the first. Therefore, as soon as the first is done, the nicking-saw is caused, by the requisite operation of the spring $r''$ and cam $u$, to recede from the head of the blank, and the toothed sector K is actuated by its cam to rotate the spindle, carrying the now half-nicked blank one-half of a revolution around its own axis—i. e., the axis of the said spindle—thereby bringing the upper part of the head of the blank into the same relation with the nicking-saw previously occupied by the upper part. This done, the cam $w''$ again moves inward the nicking-saw to form a second nick exactly opposite the first, the head of the blank, as thus nicked, having a nick with a double slope from the center of the head outward, as shown in section in Fig. 7, in side view in Fig. 8, and in top view in Fig. 9, these last-named three figures representing the screw for the manufacture of which my present invention is designed. The position of the nicking-saw with reference to the head of the blank when cutting the one or the other of the two slopes of the finished nick is more fully represented in Fig. 6. The head being thus nicked, the shaft C, with the spindles A, is further turned the one-half of a revolution in the same manner as hereinbefore described. This brings the other spindle carrying a shaved blank to the nicking-saw, to be nicked in the manner set forth. The blank already nicked is discharged from the jaws $b$ of the spindle holding the same in the same manner that the blank is discharged from the holding-jaws of a common nicking apparatus, and which, being well known in the trade, need not be here specifically described.

After the nicked blank is discharged it is, of course, replaced by another from the hopper M, and the operation proceeds upon any desired number in succession of the blanks.

It will be understood that while, in practice, a great economy in the manufacture of the screws is insured by causing the shaving to be done in the same machine, the peculiar function of my machine—the formation of the double sloping nick—would be as effectively performed if the shaving devices were dispensed with and the feed mechanism used to supply the blanks to the jaws for the sole purpose of nicking.

What I claim as my invention is—

1. In an organized machine for making sloped-nicked screws, a blank-holding spindle having an intermittent revolving movement around its own axis, in combination with a nicking-saw, W, arranged to automatically move to and from the blank-holding end $b$ of the said spindle A alternately with semi-rotations of the latter, substantially as and for the purpose set forth.

2. The improved machine, comprising the double spindles A A, revolvable around a common axis, a mechanism for giving each of the said spindles alternately a half-revolution around its own axis, and a nicking-saw adapted to approach and recede from each spindle successively after each successive semi-revolution of the same, the whole combined and arranged for operation in connection with a suitable apparatus for feeding the blanks to the holding-jaws of the spindles, substantially as and for the purpose set forth.

3. The vibratory spring-toothed sector K, in combination with the pinions C of the double revolving spindles A A, substantially as and for the purpose herein set forth.

THOS. J. SLOAN.

Witnesses:
H. WELLS, Jr.,
WM. A. J. TUNNEY.